Inventor
John Thomas Parrett
by Moore, Prangley & Clayton
Attys.

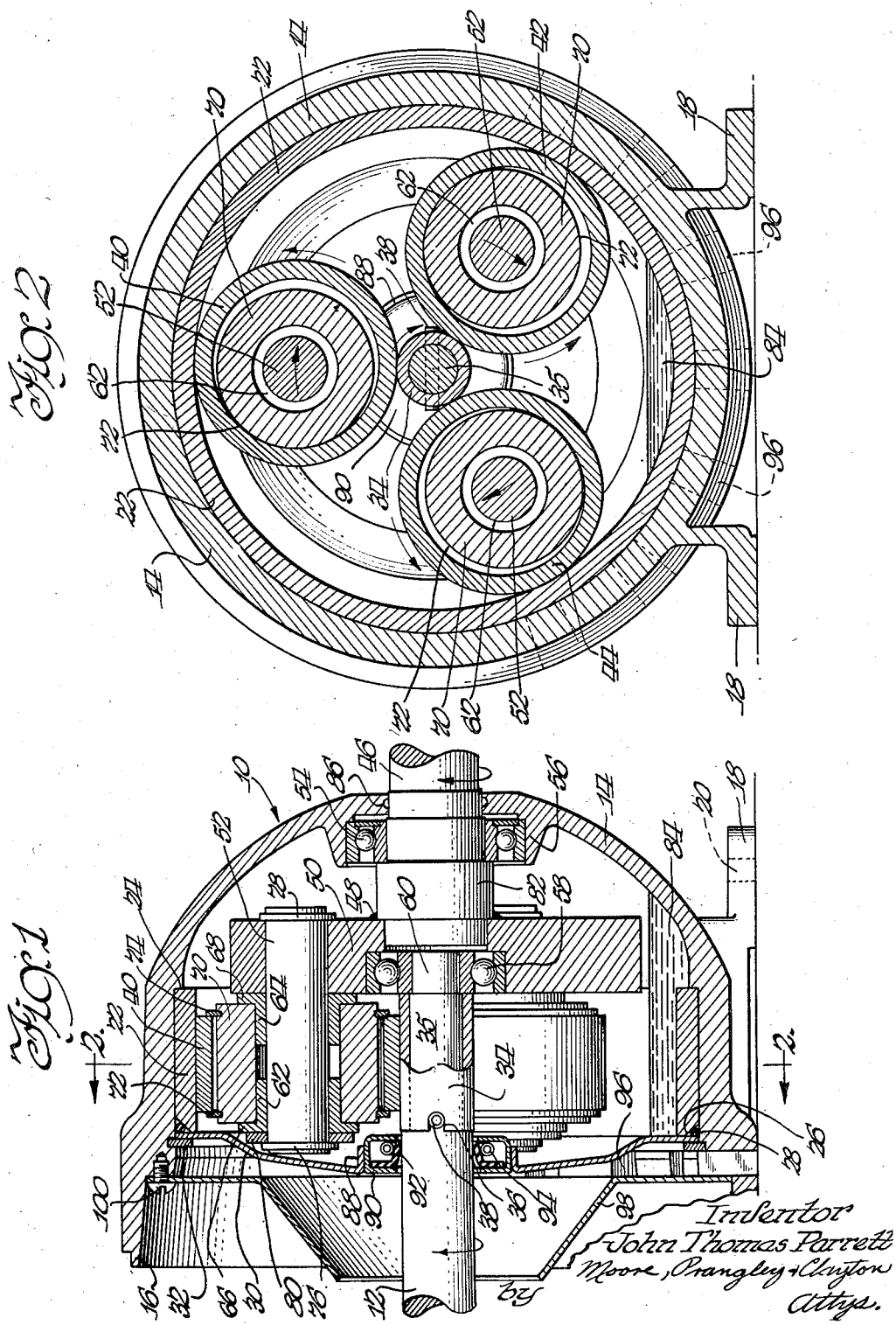

United States Patent Office 2,815,685
Patented Dec. 10, 1957

2,815,685

SPEED CHANGING MECHANISM

John Thomas Parrett, Benton Harbor, Mich.

Application March 25, 1954, Serial No. 418,621

12 Claims. (Cl. 74—798)

The present invention relates to speed change mechanisms and particularly to planetary or epicyclic speed change mechanisms utilizing rolling contact between the driving and driven members.

The speed change devices of this invention are of the type which employ a sun roller disposed within a circular outer ring. Positioned between the sun roller and the outer ring is a plurality of planetary rollers which press against both the sun roller and the outer ring so that they have a driving contact therewith. The planetary rollers carry or drive crank members that are mounted on a crank plate so that movement of the planetary rollers drives and moves the crank plate.

Various means have been utilized to restrain axial movement of the planetary rollers in prior devices. In certain of the prior devices restraining flanges are formed on either the sun roller or the outer ring which prevent axial movement of the planetary rollers relative to the sun roller and the outer ring. In other devices flanges are provided on both the sun roller and the outer ring. The friction between the guiding flanges and the planetary rollers is great enough in some instances to render the device inoperative. In any event the friction loss is so great that the efficiency of the speed change mechanism is greatly impaired.

In other forms of prior devices relative axial movement between the planetary rollers and the sun roller and outer ring is prevented by contouring the contacting surfaces. The contoured surfaces produce a high sliding friction loss because there is not pure rolling contact between such surfaces. Frictional losses in such devices are high and there is a rapid deterioration of the driving and driven surfaces.

In both of the above described prior art guiding schemes the planetary rollers are guided at only two points, these guidance points having a relatively small contact area. The guiding function is not sufficiently positive in such constructions and a considerable amount of wander of the planetary rollers occurs.

In order to eliminate unwanted friction between the contacting surfaces to as high a degree as is possible, it is desirable that the contacting surfaces be cylindrical in form throughout the contacting area so that as pure a rolling contact is obtained as possible. It is further desirable that these cylindrical surfaces be ground by the conventional centerless grinding method in finishing their surfaces since this is the most economical method for producing the degree of surface smoothness required for proper operation of this type of speed changing mechanism.

Even though centerless grinding methods are utilized in grinding the contacting surfaces, slight inaccuracies in the contacting surfaces will appear and it is for this reason that some guiding and restraining scheme must be utilized in this type of mechanism.

It is desirable to maintain the driving pressure between the contacting elements as high as possible in order to obtain the necessary transmission of force. This contact pressure is derived from the elasticity of one or more of the various rolling contacting members. In order to provide sufficient allowance for wear and in order to prevent slippage between the various contacting surfaces, it is desirable that the deflection of the contacting parts be as great as possible. The amount of useable deflection is limited by practical considerations of the fatigue life of the material and the heat generated by elastic hysteresis. These latter factors make it desirable to use as small a deflection of the rings and rollers as possible.

In order to obtain the necessary deflection to compensate for wear and give the necessary driving pressure and yet have a long fatigue life of the contacting parts and keep the heat generated by elastic hysteresis to a reasonable amount, it is necessary that at least two of the contacting elements undergo elastic deformation. One of the parts undergoing elastic deformation is preferably the planetary roller or rollers.

From the foregoing it is seen that the guiding structure for the planetary rollers which prevents relative axial movement between the planetary rollers and the sun roller and outer ring must be such as to permit and allow radial elastic deformation of the planetary rollers while performing the necessary guiding function with the required degree of guiding effectiveness. It is also desirable that the method of guiding the planetary rollers likewise permit the crank pins and crank plate to be manufactured with higher tolerances so that it is unnecessary to locate accurately the center of the crank pins and the crank plate.

Proper operation of the speed change mechanism also requires that the shafts driving the sun roller and the output shaft attached to the crank plate be supported adequately at two spaced apart points to resist any side thrust or overhung loads.

Accordingly it is an object of this invention to provide a speed change mechanism of the type set forth in which the planetary rollers are more effectively restrained from axial movement relative to the sun roller and the outer ring.

In connection with the foregoing object it is another object of this invention to provide a method and apparatus for restraining axial movement or wander of the planetary rollers with respect to the sun roller and outer ring in which the planetary rollers are restrained without any frictional engagement with other members, the restraining member rotating with the planetary roller and contacting the planetary roller substantially entirely around its periphery.

Yet another object of the invention is to provide a planetary speed change mechanism of the type set forth wherein all of the contacting surfaces can be ground by conventional centerless grinding methods thereby producing a more economical device.

Still another object of the invention is to provide in a speed change mechanism of the type set forth two contacting members which undergo elastic deflection or deformation, one of these members being the planetary roller.

A further object of the invention is to provide a guiding structure for the planetary rollers which provides proper guiding while permitting elastic deformation of the planetary roller.

A still further object of the invention is to provide in a speed change mechanism of the type set forth a mounting for the sun roller drive shaft and the crank plate and output shaft which will effectively resist side thrust and overhung loads.

These and other objects and advantages of the invention will be better understood from the following description when taken in conjunction with the accompanying drawings. In the drawings wherein like reference numerals have been utilized to indicate like parts throughout:

Fig. 1 is a view in vertical section of one preferred form of a speed change mechanism made in accordance with and embodying the principles of the present invention;

Fig. 2 is a view in vertical section of the speed change mechanism illustrated in Fig. 1 substantially as seen in the direction of the arrows along the line 2—2 of Fig. 1;

Figure 3:
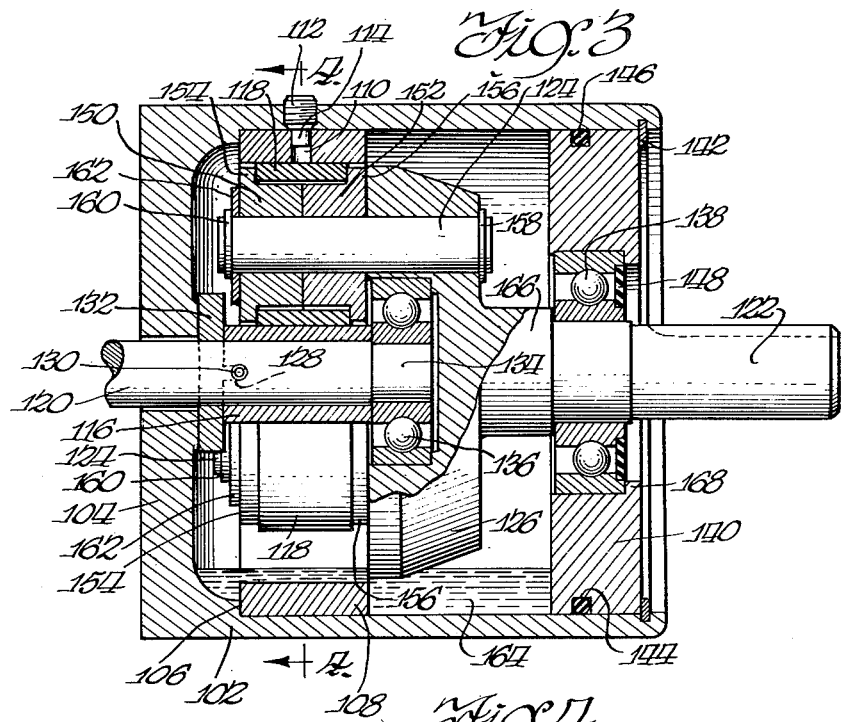
Fig. 3 is a view in vertical section of a second preferred form of the present invention.

Referring now to the drawings and first to Figs. 1 and 2 there is shown a speed change mechanism generally designated by the numeral 10 which is made in accordance with and embodies the principles of the present invention. The speed change mechanism 10 is adapted to be connected to a motor (not shown) having a motor output shaft 12. The purpose of the speed changing mechanism 10 is to change the relatively high speed rotation of shaft 12 to a relatively slower speed rotation with as small a loss of energy as possible.

Speed change mechanism 10 includes a hollow substantially hemispherically shaped housing 14 which is provided at one end with a flange 16 adapted to be fitted against a cooperating motor housing. Housing 14 is also provided with a pair of base members 18 having apertures 20 therethrough to receive bolts for attaching the housing to a fixed support.

There is provided within housing 14 a cylindrical bore which receives and holds an outer ring 22. Ring 22 is cylindrical in shape and has a relatively small thickness compared with its overall diameter. The inner surface of ring 22 is carefully machined and ground in any suitable manner such as by the conventional centerless grinding method. The right hand edge of ring 22 as viewed in Fig. 1 abuts against flange 24 formed on housing 14. The left hand edge of ring 22 is bevelled as at 26 and is provided with an O-ring seal 28 which may be formed of rubber. A circular dust and oil shield 30 abuts against the left hand end of ring 22 and presses against the O-ring seal 28. The shield 30 is in turn held in place by a retainer ring 32 disposed in a circumferential slot formed in the inner face of housing 14. Ring 32, shield 30, O-ring 28 and shoulder 24 cooperate to hold ring 22 stationary with respect to housing 14.

There is provided in substantially the geometrical center of ring 22 a sun roller 34 which is hollow and cylindrical in shape. The outer surface of roller 34 is carefully machined and ground in any suitable manner such as by the centerless grinding method. A reduced portion 35 on motor shaft 12 is received within sun roller 34 in operative position. The shoulder formed between reduced portion 35 and the main portion of motor shaft 12 positively prevents movement of sun roller 34 to the left as viewed in Fig. 1. The left hand end of sun roller 34 is provided with a pair of diametrically opposed slots 36 which receive the ends of a pin 38 carried by and extending through motor shaft 12. Motor shaft 12 thus turns sun roller 34 in a positive manner through pin 38.

Referring now more particularly to Fig. 2 it will be seen that there is provided a set of three planetary rollers 40, 42 and 44 equally spaced around the sun roller 34, the planetary rollers being compressed between sun roller 34 and the outer ring 22. The planetary rollers 40—44 are cylindrical in shape and hollow, the outer surface of each of the planetary rollers being carefully machined and ground by any suitable method such as the conventional centerless grinding method.

The output from the speed change mechanism 10 is taken from a shaft 46 which is welded as at 48 to a crank plate 50. Crank plate 50 in turn carries three crank pins 52. The left hand ends of crank pins 52 as viewed in Fig. 1 extend into the centers of the planetary rollers 40—44 and are driven thereby. Crank pins 52 in turn drive the crank plate 50 and the output shaft 46.

Output shaft 46 is supported by a ball bearing assembly 54 received and supported by a circular flange 56 on housing 14. The crank plate 50 carries in the center thereof a ball bearing assembly 58 which receives a reduced end portion 60 formed on the outermost end of motor shaft 12. The ball bearing assemblies 54 and 58 provide support for output shaft 46 and crank plate 50. In addition ball bearing assembly 58 provides additional support for motor shaft 12.

Although the inner surface of ring 22 and the outer surfaces of roller 34 and rollers 40, 42 and 44 are carefully machined and ground there will be certain inaccuracies on the surfaces thereof which will cause the planetary rollers 40—44 to move or wander in an axial direction with respect to the sun roller 34 and the outer ring 22. This tendency to wander must be overcome in a positive manner and the planetary rollers restrained to travel in a proper path. This restraining must be done with a minimum of frictional wear and loss and also must be such that diametral flexing and deformation of the planetary rollers 40, 42 and 44 can take place without interference by the restraining and guiding members.

The guiding structure in this form of the invention includes a pair of bearing members 62 and 64 which are generally cylindrical in shape and are carried by the crank pin 52. The outermost ends of the bearing members 62 and 64 are provided with outturned flanges 66 and 68, respectively. Positioned between flanges 66 and 68 and carried by the bearing members 62—64 is a guide ring support 70 that is cylindrical in shape and receives in the center thereof the main portions of bearings 62—64.

Formed around the outer periphery of the guide support 70 is a pair of slots which receive guide members 72 and 74, respectively. Each of the guide members 72 and 74 is formed as a split ring and extends substantially radially outwardly with respect to the cylindrical outer surface of guide support 70. Ring 72 fits closely against and holds the left hand end of the associated planetary roller and guide member 74 contacts and presses against the right hand end of the associated planetary roller. The outer diameter of guide members 72 and 74 is substantially greater than the internal diameter of the planetary rollers but is substantially less than the external diameter of the planetary rollers.

Each end of crank pin 52 has a substantially semi-circular slot formed around the circumference thereof to receive a split ring retainer member 76 at one end thereof and a split ring retainer member 78 at the other end thereof. Retainer member 76 fits against a washer 80 that bears against bearing flange 66. The retainer members 76 and 78 hold the bearing members 62 and 64 against the ends of the guide support 70 so that these three members rotate substantially as a unit.

The material of construction for the bearing members 62—64 is preferably bronze or some similar bearing material so that there can be easy relative rotation between flange 68 and crank plate 50 and between flange 66 and washer 80 and between the cylindrical bodies of bearing members 62—64 and the crank pin 52.

Since the guide members 72—74 grip the associated planetary roller in a firm manner, the guide support 70 rotates with the planetary roller 40. This provides effective guiding and restraining action around the entire periphery of planetary roller 40 without having any relative frictional loss between planetary roller 40 and the guide members 72—74.

It will be seen from the above construction that axial movement of the planetary rollers 40—44 to the right as viewed in Fig. 1 will be positively prevented through the action of guide member 74 acting against guide support 70 which in turn acts against bearing 64 and crank plate 50. Crank plate 50 being welded to shaft 46 is prevented from moving to the right due to an enlargement 82 bearing against ball bearing assembly 54 which is in turn restrained by the housing 14. Movement of the planetary rollers 40—44 to the left is restrained in a like manner by guide member 72 acting against guide support 70, bearing member 62, washer 80 and crank pin 52. The crank pin 52 is in turn supported by crank plate 50 which cannot move to the left due to the presence of the ball bearing assembly 58 which is held in a rigid position by motor shaft 12 and its associated thrust bearings.

The described construction thus provides positive guiding in both axial directions for the planetary rollers without the use of flanges or grooves which rotate or move with respect to the associated planetary roller. Instead the guide members 72—74 rotate with the associated planetary roller and give a constant guiding action around the entire periphery of the planetary roller.

In the described construction the outer ring 22 is made of a material such as steel which will permit elastic radial deformation. The planetary rollers 40, 42 and 44 also are formed of steel or some similar material which will permit substantial radial flexing. The planetary rollers are put into operative position in a flexed and compressed condition so that a substantial force is provided between the contacting surfaces thereby giving the desired pressure for power transmission purposes.

Since both the outer ring 22 and the planetary rollers 40, 42 and 44 are flexed and deformed, the amount of deflection in each member need be substantially less than that required if only one member such as the outer ring 22 or the planetary rollers was flexed or compressed. As a consequence, each member has a longer fatigue life and will have induced in it a smaller heat loss due to elastic hysteresis. Accordingly, sufficient elastic deformation can be built into the speed change mechanism 10 to provide the necessary force at the contacting surfaces to transmit power therethrough.

The external diameter of the guide support 70 is substantially less than the inner diameter of the associated planetary rollers 40, 42 and 44 so that the necessary elastic deformation of the planetary rollers can be obtained without binding against guide support 70. The described guide and restraining structure permits this deflection without any lessening of the positive guiding action.

A volume of oil indicated by the numeral 84 is placed in the speed change mechanism 10 to lubricate the various moving parts. This oil normally collects in the bottom when the mechanism is not in operation but is thrown to the top and to the inside of housing 10 when the unit is in operation. Accordingly, it is necessary to provide a seal to prevent escape of oil from housing 10. A seal 86 is provided around shaft 46 and thus prevents escape of oil along this shaft. Inturned flange 88 is formed on shield 30 and has welded thereto an annular seal housing 90. Positioned within housing 90 is a flexible sealing member 92 which is annular in shape and surrounds and embraces the motor shaft 12. A circular spring 94 surrounds seal 92 and presses seal 92 against motor shaft 12. The seal 92 is formed of rubber or similar flexible material and thus blocks escape of oil to the left along motor shaft 12.

In order to cool the speed change mechanism 10 and its associated motor, a plurality of air intakes 96 are provided around the periphery of housing 14 to the left as viewed in Fig. 1. There also is provided a flanged conically shaped air guide 98 which is attached to housing 14 by a plurality of screws 100.

The operation of the speed change mechanism in Figs. 1 and 2 is briefly as follows: Assuming that the motor shaft 12 is rotating is a clockwise direction as viewed in Fig. 2, the sun roller 34 will also be driven in a clockwise direction. Sun roller 34 acting against the planetary rollers will cause the planetary rollers to rotate in a generally counterclockwise direction as indicated by the arrows. Since the outer ring 22 is stationary, the planetary rollers will in effect walk around on outer ring 22 and the centers of the planetary rollers will move in a clockwise direction as indicated by the arrows in their center. Since the planetary rollers bear against and push the guide supports 70, the crank pins and the associated crank plate 50 will also be rotated in a clockwise direction. This will rotate output shaft 46 in a clockwise direction also.

The necessary contact pressure between each planetary roller and the sun roller and between each planetary roller and the outer ring 22 will be provided by the elastic deformation and compression of the outer ring 22 and the planetary rollers 40, 42 and 44. The outer ring 22 is fixedly attached to the housing 14 and the sun roller 34, output shaft and the crank plate 50 are positively prevented from relative axial movement with respect to the outer ring 22. The guide action provided by guide members 72—74 positively prevents relative axial movement between the associated planetary rollers and the outer ring and sun roller. The guide members 72 and 74 rotate with the associated planetary rollers and accordingly there is no frictional loss between the guide members and the planetary rollers. Furthermore, the guide members contact the associated planetary rollers on both sides thereof around the entire periphery thereof thus providing an extensive guiding surface. This most advantageous and effective guiding action is accomplished without interfering with the necessary diametral deflection of the planetary rollers 40, 42 and 44. This simplified guiding structure makes it possible to have the contacting surfaces of the sun roller, the planetary rollers and the outer ring perfect cylinders throughout their length and furthermore permits the use of relatively inexpensive conventional centerless grinding methods.

Since there is considerable play between the outer circumference of the guide support 70 and the inner circumference of the planetary rollers the centers for the crank pins 52 need not be drilled with any great exactitude. In other words, less expensive methods of drilling the holes to receive crank pins 52 may be utilized without impairing the functioning of the speed change mechanism.

Figure 4:
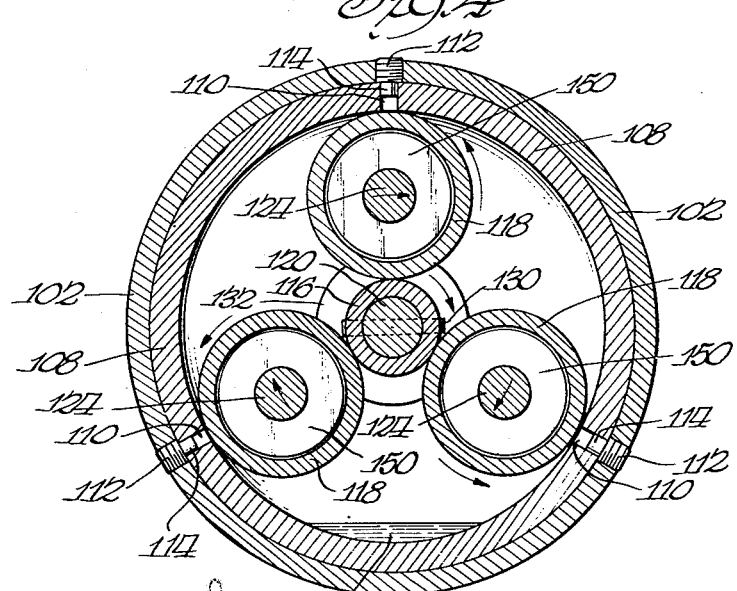
Fig. 4 is a view in vertical section of the speed change mechanism shown in Fig. 3 substantially as seen in the direction of the arrows along the line 4—4 of Fig. 3.

There is shown in Figs. 3 and 4 a second preferred embodiment of the present invention. In this form of the invention there is provided a cylindrical hollow housing 102 which is closed at the lefthand end as viewed in Fig. 3 by a wall 104. Mounted within housing 102 and abutting against a shoulder 106 is an outer ring 108 which is cylindrical and has a highly machined inner circumference. Referring to Fig. 4 it will be seen that outer ring 108 has three apertures 110 disposed around the circumference and directed radially inwardly toward the center. Aligned with apertures 110 are apertures formed in the housing 102, these latter apertures being of a larger diameter than apertures 110 and receiving a threaded member 112. The inner ends of members 112 are provided with studs 114 which extend into apertures 110. Studs 114 cooperating with apertures 110 serve to fix ring 108 firmly within housing 102.

Disposed within and in the center of inner ring 108 is a sun roller 116. Positioned between sun roller 116 and outer ring 108 are three identical planetary rollers 118. The surfaces of the sun roller 116 and the planetary rollers 118 are highly machined such as by grinding using a conventional centerless grinding method. The thickness of the planetary rollers 118 is small compared to the overall diameter thereof so that the planetary rollers can partake of diametral flucture or deformation to provide a driving force at the points of contact with the outer ring 108 and the sun roller 116. The contacting surfaces of the outer ring 108, the sun roller 116 and the planetary rollers 118 are all perfectly cylindrical throughout their contacting area and there is rolling contact between these members.

The sun roller 116 is driven by an input shaft 120 that may be driven by a conventional motor. The output of the speed change mechanism is taken from an output shaft 122 which is driven by a plurality of crank pins 124 mounted on a crank plate 126 which is formed integral with output shaft 122.

The left hand end of sun roller 116 as viewed in Fig. 3 is provided with a pair of diametrically disposed slots 128 which receive a pin 130 that also extends through input shaft 120. This forms a driving connection between input shaft 120 and sun roller 116. Movement of sun roller 116 to the left as viewed in Fig. 3 is prevented by a washer 132 which presses against the left hand end of sun roller 116 and the housing wall 104.

The right hand end of input shaft 120 has a reduced portion 134 which is carried by a ball bearing assembly 136 mounted in a recess and carried by the crank plate 126. The shoulder formed between the main portion of shaft 120 and the reduced portion 134 bears against bearing 136 and thus positively prevents movement of shaft 120 to the right. The righthand end of sun roller 116 also bears against bearing 136 which retains movement of sun roller 116 to the right.

The output shaft 122 is supported in part by the input shaft 120 through bearing 136 but is also supported by a bearing 138 which is received in and supported by a plate 140. The plate 140 is circular and fits within the righthand end of housing 102. A retainer ring 142 rests in a circumferential slot formed on the inner surface of housing 102 and holds plate 140 against movement to the right. Formed around the outer circumference of plate 140 is a channel 144 which is square in cross section and receives a resilient sealing member 146. Sealing member 146 is a rubber O-ring which forms a fluid type seal between housing 102 and plate 140 and also retains relative rotation between housing 102 and plate 140. Sealing at the righthand end of the speed change mechanism as viewed in Fig. 3 is completed by a dust seal 148 provided on the bearing member 138.

The crank pins 124 are carried in apertures formed in crank plate 126. Mounted on the lefthand end of the crank pins 124 as viewed in Fig. 3 is a pair of bushing members 150 and 152 which provide a support and guide for the associated planetary roller 118. Each of the bushing members 150—152 has a central opening therein that receives the crank pin 124. Upstanding around the circumference of each of the bushing members 150—152 is a circumferential outwardly extending flange 154 and 156 respectively. The flange 154 contacts the left hand end of planetary roller 118 in a tight manner and the flange 156 contacts the righthand end in a similar manner.

There is provided on the righthand end of crank pin 124 a split ring washer 158 which lies in a groove around the circumference of pin 124. A similar split ring washer 160 is provided in a groove formed on the lefthand end of crank pin 124. A washer 162 is positioned between split ring washer 160 and the adjacent bushing member 150. The split ring washers 158 and 160 together with the washer 162 holds the bushing members 150 and 152 in a central position upon crank pin 124 and planetary roller 118. The dimensions of the parts are such that the flanges 154 and 156 are pressed against the opposite ends of the planetary roller 118 so that the bushing members and the associated planetary roller rotate as a unit.

The bushing members 150 and 152 are formed of bronze or some similar bearing material so that substantially friction free movement is obtained between bushing members 150—152 and pin 124 and between bushing member 152 and crank plate 126 and between bushing member 150 and the washer 162. This construction gives positive guiding action for the planetary roller 118 around its entire circumference without having any friction loss between the planetary roller 118 and the guiding flanges 154—156.

As may be best seen in Fig. 3 the diameter of the portions of bushing members 150—152 which extend into the center of planetary roller 118 is slightly less than the internal diameter of planetary roller 118 so that there is substantial clearance to permit diametral flucture and distortion of planetary roller 118 during operation. The flanges 154—156 have a diameter that is substantially greater than the internal diameter of planetary roller 118 whereby to give positive guiding action but substantially less than the external diameter of planetary roller 118 whereby to permit diametral flucture and distortion of the planetary rollers during operation.

It is desirable to include a quantity of oil 164 within the speed change mechanism to lubricate the parts during operation. The sealing members described above including washer 132, O-ring 146 and seal 148 retain the oil within the speed change mechanism.

The operation of the speed change mechanism of Figs. 3 and 4 is briefly as follows. Assuming that the input shaft 120 rotates clockwise as viewed in Fig. 4, the sun roller 116 will also be driven in a clockwise direction as indicated by the accompanying arrow. This will rotate the planetary rollers 118 in a counterclockwise direction about their centers as indicated by the arrows. The planetary rollers 118 will thus be caused to walk around upon outer ring 108 in a clockwise direction thus moving the crank pins 124 in a clockwise direction as indicated by the arrows in their centers. This clockwise movement of crank pins 124 drives crank plate 126 and the output shaft 122 in a clockwise direction. It will be seen therefore that the output shaft 122 will be rotated and driven in the same direction as tthe input shaft 120 but at a slower rate. The necessary driving for transmission of energy from shaft 120 to shaft 122 results from the fact that outer ring 108 and the planetary rollers 118 are deformed and compressed to provide frictional engagement at their contacting surfaces.

The speed change mechanism illustrated in Figs. 3 and 4 which has been described above fulfills all the objects and provides the advantages of the present invention. More specifically the sun roller 116 is supported along the entire length thereof, by the planetary rollers. Movement of the sun roller 116 in axial direction is positively prevented on the left by washer 132 acting against wall 104 and on the right by bearing member 136. Relative axial movement of outer ring 108 with respect to housing 102 and sun roller 116 is positively prevented by the stud 114.

Although the surface of the sun roller 116, the inner surface of the outer ring 108 and the outer surfaces of the planetary rollers 118 are highly machined by the centerless grinding method there will still be small inaccuracies in the surfaces thereof which would cause wander or relative movement of the planetary rollers in an axial direction with respect to the outer ring 108 and the sun roller 116. Such axial movement is positively prevented by the restraining flanges 154 and 156 which contact the planetary rollers on both sides thereof around the entire circumference thereof. These restraining flanges contact the planetary roller over an appreciable distance and rotate therewith thus eliminating friction losses between the planetary rollers and the restraining flanges.

Since the portions of bushing members 150 and 152 which extend into the center of the planetary rollers 118 are of substantially smaller diameters than the inner diameter of the associated planetary roller diametral distortion and compression of the planetary rollers 118 can be accommodated. In addition the centers of the crank plate and the apertures of the crank pins can be drilled by less accurate and therefore less expensive methods since any inaccuracies in these centers is compensated for by the loose fit between the restraining members and the planetary rollers.

The output shaft 122 is supported at two places, namely by bearing 136 on the end of input shaft 120 and by the bearing member 138 in plate 140. Axial movement of this shaft 122 and its attached portions including the crank plate 126 and the guide flanges 154—156 are prevented from axial movement in a positive manner. Movement to the left is prevented by bearing 136 pressing against the larger portion of shaft 120. Movement to the right is prevented by an enlarged portion 166 bearing against bearing member 136 which in turn is restrained by a flange 168 formed on plate 140.

This application is a continuation-in-part of my co-pending application Serial No. 328,911, filed December 31, 1952, for Speed Changing Mechanism, now abandoned.

Although certain preferred embodiments of the invention have been given for purposes of illustration, it is to be understood that various changes and modifications can be made therein without departing from the spirit and scope of this invention. Accordingly the invention is to be limited only as set forth in the following claims.

I claim:

1. A speed changing device comprising a housing, an outer ring mounted on said housing, a sun roller disposed at the center of said ring, a planetary roller disposed between said ring and said sun roller, the contacting surfaces of said ring and said rollers being cylindrical throughout their engaging surfaces, said planetary roller having an aperture in the center thereof and being under compression so that the elastic properties thereof are utilized to maintain driving contact between the engaging surfaces, a crank member including a portion disposed in the aperture of said planetary roller and rotatable therewith, a pair of retaining members carried by said crank member, one of said retaining members contacting one end of the planetary roller around the circumference thereof and rotating therewith and the other of said retaining members contacting the other end of the planetary roller around the circumference thereof and rotating therewith, means independent of said planetary roller to prevent relative axial movement between said ring and said sun roller and said crank member, and means positively to prevent longitudinal axial movement of said retaining members with respect to said crank member thereby positively preventing movement of the planetary roller in an axial direction while permitting free rotation thereof.

2. A speed changing device comprising a housing, an outer ring fixedly mounted on said housing, a sun roller disposed at the center of said ring, means to prevent relative movement between said ring and said sun roller in a direction parallel to the longitudinal axis of said sun roller, a planetary roller disposed between said ring and said sun roller, the contacting surfaces of said ring and said rollers being cylindrical throughout their engaging surfaces, said planetary roller having an aperture in the center thereof and being under compression so that the elastic properties thereof are utilized to maintain driving contact between the rolling surfaces, a crank member disposed in the aperture of said planetary roller, a pair of separate retaining members removably carried by said crank member, one of said retaining members contacting one end of the planetary roller around the circumference thereof and rotating therewith and the other of said retaining members contacting the other end of said planetary roller around the circumference thereof and rotating therewith, said retaining members being readily removable from said crank member for replacement of said planetary roller, and means positively to prevent longitudinal axial movement of said crank member and said retaining members thereby positively preventing movement of the associated planetary roller in an axial direction while permitting free rotation thereof.

3. A speed changing device comprising a housing, an outer ring fixedly mounted within said housing, a sun roller disposed at the center of said ring, a planetary roller disposed between said ring and said sun roller, the contacting surfaces of said ring and said rollers being cylindrical throughout their engaging surfaces, said planetary roller having an aperture in the center thereof and being under compression so that the elastic properties thereof are utilized to maintain contact between the engaging surfaces, a guide ring support positioned within the aperture of said planetary roller, said guide ring support carrying a pair of separate guide rings, one of said guide rings contacting one end of said planetary roller and the other guide ring contacting the other end of said planetary roller, said guide ring support and guide rings being mounted for rotation with said planetary roller, and means positively to prevent longitudinal movement of said guide ring support and said guide rings thereby positively preventing movement of the planetary roller in an axial direction while permitting free rotation thereof.

4. A speed changing device comprising a housing, an outer ring fixedly mounted on said housing, a sun roller disposed at the center of said ring, means to prevent relative movement between said ring and said sun roller in a direction parallel to the longitudinal axis of said sun roller, a plurality of planetary rollers disposed between said ring and said sun roller, the contacting surfaces of said ring and said rollers being cylindrical throughout their engaging surfaces, each of said planetary rollers having an aperture in the center thereof and being under compression so that the elastic properties thereof are ulitized to maintain driving contact between the rolling surfaces, a crank member disposed in the aperture of each of said planetary roliers, a pair of separate retaining members rotatably carried by each crank member, one of said retaining members contacting one end of the associated planetary roller around the circumference thereof and rotating therewith and the other of said retaining members contacting the other end of the associated planetary roller around the circumference thereof and rotating therewith, and means positively to prevent longitudinal axial movement of each of said crank members and said retaining members thereby positively preventing movement of the associated planetary roller in an axial direction while permitting free rotation thereof.

5. A speed changing device comprising a housing, an outer ring fixedly mounted within said housing, a sun roller disposed at the center of said ring, a plurality of planetary rollers disposed between said ring and said sun roller, the contacting surfaces of said ring and said rollers being cylindrical throughout their engaging surfaces, each of said planetary rollers having an aperture in the center thereof and being under compression so that the elastic properties thereof are utilized to maintain contact between the engaging surfaces, a guide ring support positioned within the aperture of each planetary roller, each of said guide ring supports carrying a pair of guide rings, one of said guide rings contacting one end of the associated planetary roller and the other guide ring contacting the other end of the associated planetary roller, said guide ring support and guide rings being mounted for rotation with the associated planetary roller, means independent of said planetary rollers to prevent relative axial movement between said ring and said sun roller and said guide ring supports, and means positively to prevent longitudinal movement of each of said guide ring supports and said guide rings thereby positively preventing movement of the planetary rollers in an axial direction while permitting free rotation thereof.

6. A speed changing device comprising a housing, an outer ring fixedly mounted within said housing, a sun roller disposed at the center of said ring, a plurality of planetary rollers disposed between said ring and said sun roller, the contacting surfaces of said ring and said rollers being cylindrical throughout their engaging surfaces, each of said planetary rollers having an aperture in the center thereof and being under compression so that the elastic properties thereof are utilized to maintain driving contact between the engaging surfaces, a pair of bushing members mounted within the aperture in each of said planetary rollers, one of said bushing members having an outwardly extending flange extending around the circumference thereof and contacting one end of the associated planetary roller, the other bushing member having an outwardly extending flange thereon extending around the circumference thereof and contacting the other end of the associated planetary roller, means independent of said planetary rollers to prevent relative axial movement between said ring and said sun roller and said pairs of bushing members, and means positively to prevent longitudinal axial movement of said bushing members thereby positively preventing movement of the associated planetary rollers in an axial direction while permitting free rotation thereof.

7. A speed changing device comprising a housing, an outer ring fixedly mounted within said housing, a sun roller disposed at the center of said ring, a plurality of planetary rollers disposed between said ring and said sun roller, the contacting surfaces of said ring and said rollers being cylindrical throughout their engaging surfaces, said planetary rollers being under elastic compression and said outer ring being under elastic deflection so that the elastic properties thereof are utilized to maintain contact between the engaging surfaces, each of said planetary rollers having an aperture in the center thereof, a crank plate mounted adjacent said ring and rollers for rotation about the same axis as said sun roller, a crank pin for each of said planetary rollers having one end thereof extending into the aperture of the associated planetary roller and having the other end thereof mounted on said crank plate, a pair of spaced apart bearing members mounted on each of said crank pins, a guide ring support mounted on and rotatably carried by each pair of bearing members within the aperture of an associated planetary roller, each guide ring support carrying a pair of spaced apart guide rings, one of said guide rings contacting one end of the associated planetary roller and the other guide ring contacting the other end of the associated planetary roller, said guide ring support and guide rings and bearing members being mounted for rotation as a unit with the associated planetary roller, and means positively to prevent longitudinal movement of said guide rings and said crank plate thereby positively preventing longitudinal axial movement of the associated planetary roller while permitting free rotation thereof.

8. A speed changing device comprising a housing, an outer ring fixedly mounted within said housing, a sun roller disposed at the center of said ring, a plurality of planetary rollers disposed between said ring and said sun roller, the contacting surfaces of said ring and said roller being cylindrical throughout their engaging surfaces, said planetary rollers being under elastic compression and said outer ring being under elastic deflection so that the elastic properties thereof are utilized to maintain contact between the engaging surfaces, each of said planetary rollers having an aperture in the center thereof, a guide ring support positioned within the aperture in each planetary roller, each guide ring support carrying a pair of spaced apart and separate guide rings, one of said rings contacting one end of the associated planetary roller and the other guide ring contacting the other end of the associated planetary roller, said guide ring support and guide rings being mounted for rotation as a unit with the associated planetary roller, means independent of said planetary rollers to prevent relative axial movement between said ring and said sun roller and said guide ring supports, and means positively to prevent longitudinal movement of said guide rings with respect to the associated guide ring support thereby positively to prevent longitudinal axial movement of the associated planetary roller while permitting free rotation thereof.

9. A speed changing device comprising a housing, an outer ring fixedly mounted within said housing, a sun roller disposed at the center of said ring, a plurality of planetary rollers disposed between said ring and said sun roller, each of said planetary rollers having an aperture in the center thereof, a crank plate mounted adjacent said ring and rollers for rotation about the same axis as said sun roller, a crank pin for each of said planetary rollers having one end thereof extending into the aperture of an associated planetary roller and having the other end thereof mounted on said crank plate, a guide ring support mounted on and rotatably carried by each of said crank pins within the aperture of an associated planetary roller, each guide ring support carrying a pair of spaced apart guide rings, one of said guide rings contacting one end of the associated planetary roller and the other guide ring contacting the other end of the associated planetary roller, said guide ring support and guide rings being mounted for rotation as a unit with the associated planetary roller, and means positively to prevent longitudinal movement of said guide rings thereby positively preventing longitudinal axial movement of the associated planetary roller while permitting free rotation thereof.

10. A speed changing device comprising a housing, an outer ring fixedly mounted within said housing, a sun roller disposed in the center of said ring, a plurality of planetary rollers disposed between said ring and said sun roller, each of said planetary rollers having an aperture in the center thereof, a crank plate mounted adjacent said ring and rollers for rotation about the same axis as said sun roller, a crank pin for each of said planetary rollers having one end thereof extending into the aperture of the associated planetary roller and having the other end thereof mounted on said crank plate, a pair of spaced apart bearing members mounted on each of said crank pins, a guide ring support mounted on and rotatably carried by each pair of bearing members within the aperture of an associated planetary roller, each guide ring support carrying a pair of spaced apart guide rings, one of said guide rings contacting one end of the associated planetary roller and the other guide ring contacting the other end of the associated planetary roller, said guide ring support and guide rings and bearing members being mounted for rotation as a unit with the associated planetary roller, and means positively to prevent longitudinal movement of said guide rings and said crank plate thereby positively preventing longitudinal axial movement of the associated planetary roller while permitting free rotation thereof.

11. A speed changing device comprising a housing, an outer ring fixedly mounted within said housing, a sun roller disposed at the center of said ring, a planetary roller disposed between said ring and said sun roller, said planetary roller having an aperture in the center thereof, a crank plate mounted adjacent said ring and rollers for rotation about the same axis as said sun roller, a crank pin having one end thereof extending into the aperture of the planetary roller and having the other end thereof mounted on said crank plate, a pair of spaced apart bearing members mounted on said crank pin, a guide ring support mounted on and rotatably carried by said bearing members within the aperture of the associated planetary roller, said guide ring support carrying a pair of spaced apart guide rings, one of said guide rings contacting one end of said planetary roller and the other guide ring contacting the other end of said planetary roller, said guide ring support and guide rings and bearing members being mounted for rotation as a unit with said planetary roller, and means positively to prevent longitudinal movement of said guide rings and said crank plate thereby positively preventing longitudinal axial movement of said planetary roller while permitting free rotation thereof.

12. A speed changing device comprising a housing, an outer ring fixedly mounted within said housing, a sun roller disposed at the center of said ring, a planetary roller having an aperture at the center thereof and disposed between said ring and said sun roller, the contacting surfaces of said ring and said rollers being cylindrical throughout their engaging surfaces, said planetary roller being under elastic compression and said outer ring being under elastic deflection so that the elastic properties thereof are utilized to maintain contact between the engaging surfaces, a crank plate mounted adjacent said ring and rollers for rotation about the same axis as said sun roller, a crank pin having one end thereof extending into the aperture of said planetary roller and having the other end thereof mounted on said crank plate, a pair of spaced apart bearing members mounted on said crank pin, a guide ring support mounted on and rotatably carried by said bearing members within the aperture of said planetary roller, said guide ring support carrying a pair of spaced apart guide rings, one of said guide rings contacting one end of said planetary roller and the other guide ring contacting the other end of said planetary roller, said guide ring support and guide rings and bearing members being mounted for rotation as a unit with said planetary roller, and means positively to prevent longitudinal movement of said guide rings and said crank plate thereby positively preventing longitudinal axial movement of said planetary roller while permitting free rotation thereof.

References Cited in the file of this patent

UNITED STATES PATENTS

| | | |
|---|---|---|
| 986,588 | O'Kelly | Mar. 14, 1911 |
| 1,071,719 | Fast | Sept. 2, 1913 |
| 2,344,078 | Brissonnet et al. | Mar. 14, 1944 |
| 2,520,887 | Miller | Aug. 29, 1950 |

FOREIGN PATENTS

| | | |
|---|---|---|
| 22,188 | Great Britain | Nov. 6, 1899 |